United States Patent
Flum et al.

(10) Patent No.: US 6,668,681 B2
(45) Date of Patent: Dec. 30, 2003

(54) HANDLEBAR WITH ADJUSTABLE DAMPENING MECHANISM

(75) Inventors: Andrew S. Flum, Palmdale, CA (US); Patrick Mills, Granada Hills, CA (US)

(73) Assignee: Titeq Corporation, Palmdale, CA (US)

( * ) Notice: Subject to any disclaimer, the term of this patent is extended or adjusted under 35 U.S.C. 154(b) by 0 days.

(21) Appl. No.: 10/150,451

(22) Filed: May 16, 2002

(65) Prior Publication Data

US 2002/0170378 A1 Nov. 21, 2002

Related U.S. Application Data

(60) Provisional application No. 60/291,748, filed on May 16, 2001.

(51) Int. Cl.⁷ .............................................. B62K 21/12
(52) U.S. Cl. ...................................................... 74/551.1
(58) Field of Search ............................ 74/551.1–551.8; 29/428; D12/178

(56) References Cited

U.S. PATENT DOCUMENTS

| | | |
|---|---|---|
| 4,635,499 A | 1/1987 | McMurtrey |
| 5,117,708 A | 6/1992 | Boyer et al. |
| 5,133,224 A * | 7/1992 | Prins .......................... 74/551.3 |
| 5,257,552 A | 11/1993 | Boyer et al. |
| 5,285,698 A * | 2/1994 | Liao ........................... 74/551.8 |
| 5,463,918 A * | 11/1995 | Lemieux et al. ............... 81/487 |
| 5,701,771 A * | 12/1997 | Bailey ........................ 70/233 |
| 6,122,991 A | 9/2000 | Clarkson |
| 6,182,528 B1 | 2/2001 | Renshaw |
| 6,485,216 B1 * | 11/2002 | Cheng ........................ 403/102 |

FOREIGN PATENT DOCUMENTS

| | | | | |
|---|---|---|---|---|
| DE | 10031853 A1 * | 1/2002 | ................ | 74/551.8 |
| GB | 2080920 A * | 2/1982 | ................ | 74/528 |
| JP | 8-198159 | * 8/1996 | ................ | 74/551.1 |
| JP | 2000-289673 | * 10/2000 | ................ | 74/551.1 |
| WO | WO 98/42560 | * 10/1998 | ................ | 74/551.1 |

* cited by examiner

*Primary Examiner*—Vinh T. Luong
(74) *Attorney, Agent, or Firm*—Blakely, Sokoloff, Taylor & Zafman LLP

(57) ABSTRACT

A handlebar for a vehicle made of a tubing. The tubing includes a central region, bent regions extending from opposing ends of the central region, and handgrip regions extending from the distal ends of the bent regions. The central region is configured to permit attachment to the vehicle by a securing member. Each bent region includes a bent portion at each of the two opposing ends of the bent region. A rod disposed within the tubing contacts an inner wall of the tubing at the four bent portions.

21 Claims, 5 Drawing Sheets

HANDLEBAR WITH ADJUSTABLE DAMPENING MECHANISM

CROSS REFERENCE TO RELATED APPLICATION

This application claims the benefit of the U.S. Provisional Application No. 60/291,748 filed May 16, 2001, and whose entire contents are hereby incorporated by reference.

FIELD OF THE INVENTION

The present invention is directed to handlebars and, more particularly, to handlebars with an adjustable dampening mechanism for motorcycles, bicycles, all terrain vehicles, and personal watercrafts.

BACKGROUND OF THE INVENTION

Handlebars for motorcycles generally comprise a single length of low carbon alloy steel tube appropriately bent to provide a central region, bent regions, and respective handgrip regions, the former being clamped at one or two positions to form a connection to the main cycle frame via an intermediate top yoke or stem. To reduce weight, aftermarket handlebars are typically formed from aluminum. For additional strength, it has been conventional to provide a crossbar spanning the central region of the aluminum tube. Alternatively, the handlebar may be strengthened by providing an aluminum tube with a greater external diameter at the central region, wherein the diameter of the aluminum tube is gradually reduced towards the distal ends.

U.S. Pat. No. 4,635,499 discloses a conventional handlebar 10 of the first type. This type of handlebar 10 is commonly used for offroad motorcycles, all terrain vehicles and personal watercrafts. Referring to FIG. 1, the handlebar 10 has a central region 12, two bent regions 14, 16, and two handgrip regions 18, 20. The diameter of the handlebar 10 is uniform throughout the entire lengthwise dimension. In general, the preferred diameter of conventional handlebars is ⅞ inch because this provides the handgrip regions 18, 20 with the proper amount of thickness so that a handgrip with a thickness of approximately ⅛ to ¼ inch can be fitted over a portion of each handgrip region 18, 20. Although a ⅞ inch diameter tubing 22 is ideal for facilitating a properly sized handgrip for the rider, the tubing 22 does not have sufficient strength to withstand the impact of heavy loads. As such, a crossbar 24 is used to reinforce the tubing 22 and to prevent the tubing 22 from buckling. The crossbar 24 is attached between the two bent regions 14, 16 and is oriented generally parallel to the central region 12. When the crossbar 24 is used, a permanent compression set occurs in the bent regions 14, 16 in the event of an impact. Furthermore, the crossbar 24 provides no added benefit when steering the vehicle because the crossbar 24 reinforces the handlebar 10 in only the vertical direction while providing no reinforcement in the horizontal direction. Another problem with the crossbar 24 is that a permanent compression set may occur in the event of an impact because the attachment points 26, 28 of the crossbar 24 at the bent regions 14, 16 act as a stress concentration site. In addition, the crossbar 24 constrains any movement of the tubing 22 that would soften shock loads to the handgrip regions 18, 20. The crossbar 24 may further be a safety hazard. In particular, the rider may impact the crossbar during a crash.

In order to resolve some of the problems associated with crossbars, U.S. Pat. No. 5,257,552 discloses an integrally formed unitary hollow tubular handlebar 50 of the latter type wherein the wall thickness is greatest and constant in the central region 52, smallest and constant at the handgrip regions 54, 56, and tapering in the bent regions 58, 60 as shown in FIG. 2. This improved handlebar 50 eliminates the need for a crossbar by increasing the diameter and sidewall thickness of the central region 52 of the handlebar 50, while the reduction in diameter along the bent regions 58, 60 and handgrip regions 54, 56 allows the use of standard handgrips. Without the crossbar, the handlebars 50 has a longer unsupported span, thereby providing more cushioning strength and greater steering control. However, the problem with such a configuration is that a custom triple clamp assembly must be used to secure the handlebar 10 to the main frame of the vehicle because the diameter of the central region 52 is greater than the standardized ⅞ inch diameter. As a result, the available selection of triple clamp assemblies is relatively limited and custom units, which are generally costly, may be required. Furthermore, it is substantially more costly to fabricate tapered handlebars than handlebars with uniform tubes.

U.S. Pat. No. 6,182,528 discloses another handlebar configuration which eliminates the need of a crossbar by having a unitary handlebar 100 comprising an inner tubular member 102 of constant diameter and constant wall thickness and an outer tubular sleeve 104 surrounding the inner tubular member 102 as shown in FIG. 3. Both the inner tubular member 102 and the outer tubular sleeve 104 have a central region 106, bent regions 108, 110, and handgrip regions 112, 114. The handgrip regions 112, 114 of the inner tubular member 102 extend beyond the handgrip regions 112, 114 of the outer tubular sleeve 104. The two-layer configuration allows the use of two different materials to provide a stronger, but more notch sensitive material for the inner tubular member 102 and a more ductile but less notch sensitive material with greater fatigue resistant properties for the outer tubular sleeve 104. This configuration is advantageous in minimizing stress and impact damage at the locations where the handlebar 100 is clamped to the triple clamp assembly. In the manufacturing process, the inner tubular member 102 and the outer tubular sleeve 104 are formed separately from metal tubes. The thickness of the outer tubular sleeve 104 is reduced prior to insertion of the inner tubular member 102. Thereafter, the outer tubular sleeve 104 and inner tubular member 102 are shaped together by bending in a conventional manner. Although the outer tubular sleeve 104 comprises a ⅞ outer diameter which is compatible with standard triple clamp assemblies, the fabrication costs are relatively high due to the two-layer construction.

In view of the above, it is apparent that there is a need to provide a handlebar which is capable of withstanding large impact loads while being sufficiently flexible to dampen some of the impact loads. However, the preferred dampening characteristics of the handlebar may depend on the particular riding application (i.e. moto-cross, super cross, desert riding, etc.), physical characteristics of the rider (i.e. size, weight, strength, etc.), suspension system of the vehicle (i.e. spring rate of the fork tubes, xxx, etc.), and the personal preference of the rider. This is particularly important for racing purposes where a slight improvement in the performance of the vehicle provides the rider with a competitive advantage. An operator may incur substantial costs to meet these requirements, wherein a number of prototype handlebars may be needed to first determine the appropriate handlebar configuration for a particular rider and track. Since a rider usually operates the vehicle at several tracks, an inventory of handlebars tailored for each or at least some of the tracks may be needed. In addition to the development and inventory costs, preparation of the vehicle for a particular track may include removal and installation of the handlebar. Thus, there is a need to provide a handlebar which is adaptable to various track and rider conditions. There is also a need to provide a handlebar which is lightweight, durable, easy to manufacture, compatible with existing vehicles, and relatively inexpensive.

SUMMARY OF THE INVENTION

In accordance with the present invention, a handlebar is provided with a titanium tubing capable of absorbing impact loads to reduce rider fatigue and enhance control of a vehicle. In particular, the handlebar is configured with a relatively long unsupported span which allows the tubing to react more readily to impact loads by flexing. The handlebar includes a central region having a first end and a second end, a first bent region extending from the first end of the central region, a second bent region extending from the second end of the central region, a first handgrip region extending from a distal end of the first bent region, and a second handgrip region extending from a distal end of the second bent region. Bent portions adjoin each of the regions. The handlebar is formed by extruding the tubing, cutting the tubing to the desired length, and bending the tubing in the extruded state.

The handlebar further includes an adjustable dampening mechanism which allows an operator to vary the stiffness of the handlebar. The adjustable dampening mechanism includes a rod disposed within the tubing, wherein the rod contacts the internal wall of the tubing at the bent portions. The bending resistance of the rod at the bent portions increases the stiffness of the handlebar. Stiffness of the handlebar can be increased or decreased by respectively increasing or decreasing rod tension.

Other aspects, features and techniques of the invention will become apparent to one skilled in the relevant art in view of the following detailed description of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative for teaching one skilled in the art to employ the present invention in virtually any appropriately detailed system, structure or manner.

Figure 1:
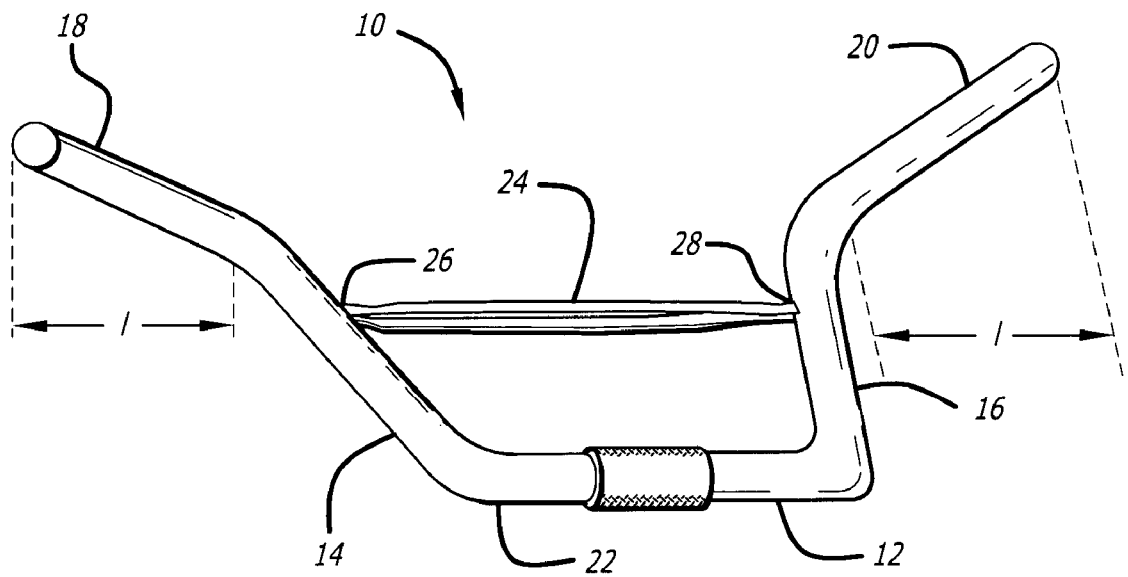
FIG. 1 is a perspective view of a prior art handlebar having a crossbar.
Figure 2:
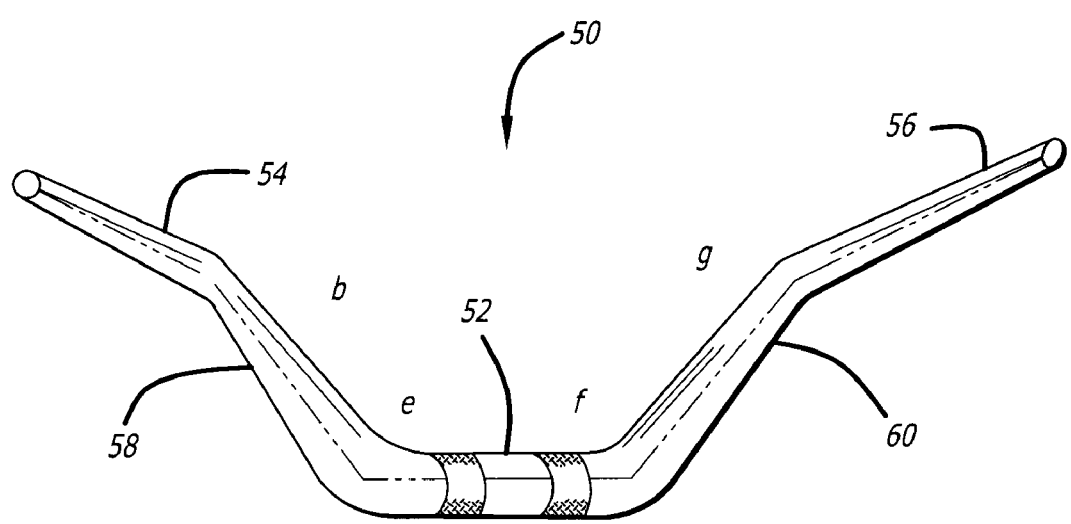
FIG. 2 is a perspective view of another prior art handlebar having a large diameter central region, tapered bent regions, and handgrip regions.
Figure 3:
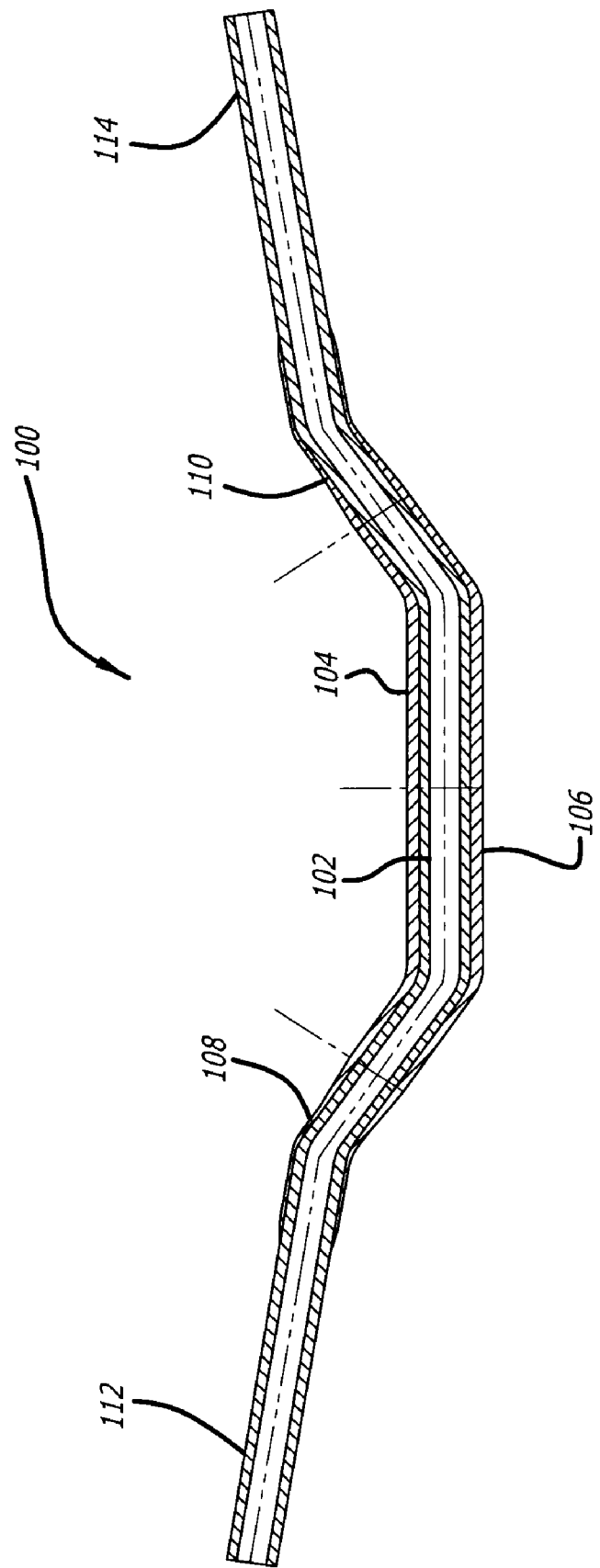
FIG. 3 is a perspective view of another prior art handlebar having a dual-layer tube construction.
Figure 4:
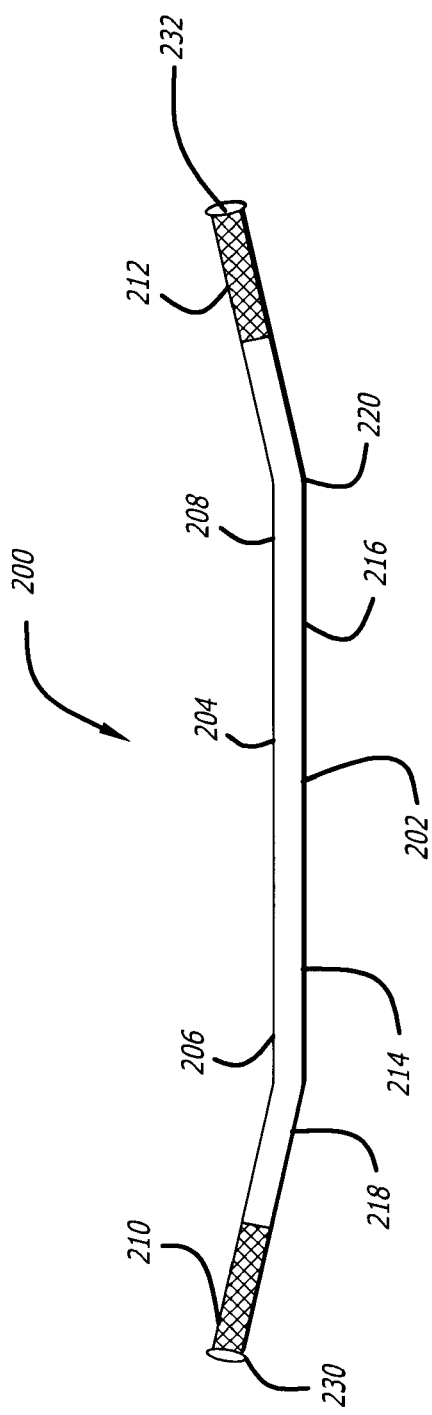
FIG. 4 is a top plan view of an exemplary handlebar of the present invention.
Figure 5:
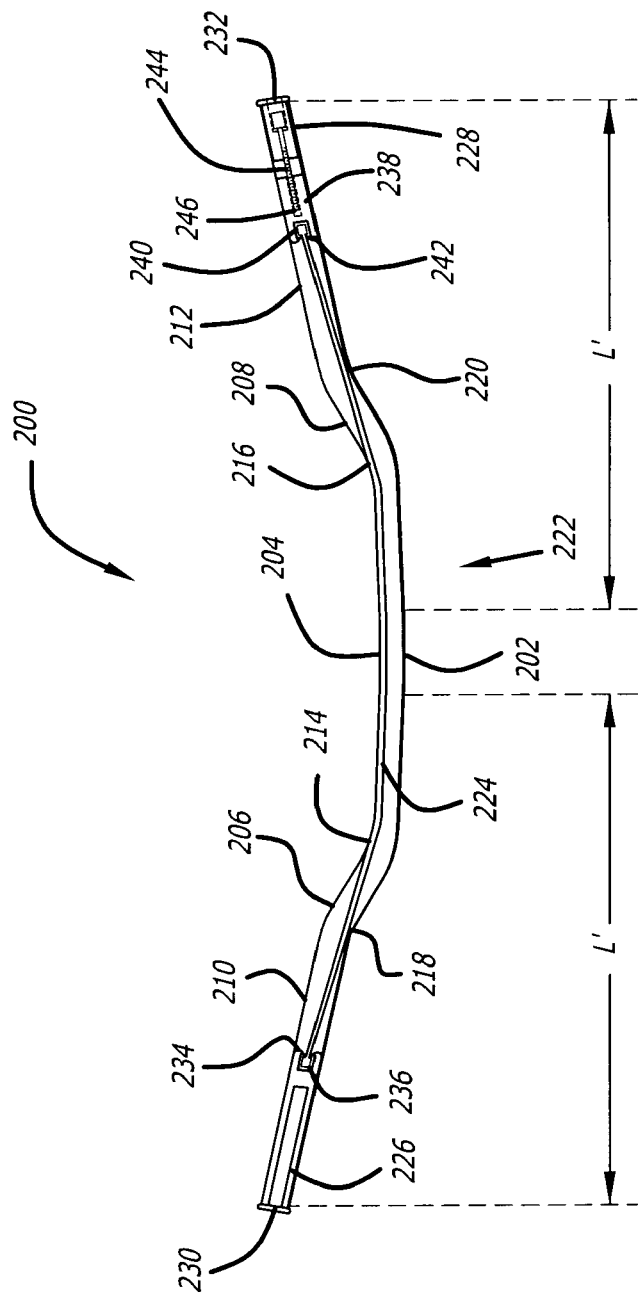
FIG. 5 is a front plan view of the handlebar of FIG. 4 illustrating an adjustable dampening mechanism.

A handlebar 200 of the present invention for motorcycles, bicycles, all terrain vehicles, personal watercrafts and other forms of handlebar steered vehicles is shown in FIGS. 4 and 5. The handlebar 200 may be formed from a single length of tubing 202 such as chrome molybdenum, aluminum, titanium, or the like. In this particular embodiment, Ti-3Al-2.5V is used. However, any titanium alloy having a tensile strength of at least 120 ksi may be used. The handlebar 200 is shown having a conventional steerhorn shape but any other shape may be used. The handlebar 200 includes a central region 204, bent regions 206, 208 extending distally from the ends of each central region 204, and handgrip regions 210, 212 extending distally from the ends of each central region 204. Bent portions 214, 216, 218, 220 adjoin each of the regions 204, 206, 208, 210, 212. The lengths of these regions 204, 206, 208, 210, 212 and the relative angles of the bent portions 214, 216, 218, 220 may vary depending on the type of vehicle.

The tubing 202 has a constant outer diameter and wall thickness throughout its entire length. In the particular embodiment shown in FIGS. 4 and 5, the handlebar 200 has an outer diameter of ⅞ inch and a wall thickness of 0.061 inch. A ⅞ inch outer diameter is selected because it is compatible with factory triple clamp assemblies for off road motorcycles configured for Moto-Cross, Super Cross and Desert Riding. It is contemplated that the wall thickness may range from 0.061 inches to 0.250 inches for most applications.

Referring to FIG. 5, the handlebar 200 has an adjustable dampening mechanism 222 to further strengthen the handlebar 200 and to enable an operator to selectively adjust the stiffness of the handlebar 200. In lieu of a crossbar, the adjustable dampening mechanism 222 provides additional structural support such that the tubing 202 is not limited to titanium. As discussed previously, the tubing 202 may be made from conventional alloys other than titanium such as chrome molybdenum, aluminum, magnesium and the like.

Referring back to FIG. 5, the adjustable dampening mechanism 222 has a rod 224 with ends respectively secured to the handgrip regions 206, 208 by a first rod restraint 226 and a second rod restraint 228. In the exemplary embodiment, the outer diameter of the rod 224 may range from about ¼ inch to about 3/16 inch and may be formed from a high strength material which is resistant to bending such as 15-5 heat treated stainless steel, 6-4 heat treated titanium, 4130 heat treated carbon steel, and the like. Preferably, the tensile strength of the rod 224 is greater than the tensile strength of the tubing 202 such that the rod 224 is able to further stiffen the handlebar 200. The first 226 and second rod restraint 228 have an outer tubular surface which abuts the interior wall of the tubing 202. Rings 230, 232 extends radially outwardly from the distal ends of the outer tubular surfaces such that the first 226 and second rod restraint 228 are inserted into the tubing 202 and are lockingly secured to the tubing 202 as the rings 230, 232 abut the distal ends of the tubing 202. One end of the rod 224 is secured to the first rod restraint 226 by a groove 234 and flange 236 arrangement. The other end of the rod 224 is secured to an adapter 238 by another groove 240 and flange 242 arrangement. The adapter 238 is appropriately sized to allow distal/proximal movement within the tubing 202. The adapter 238 is coupled to the second rod restraint 228 by a bias member. In the exemplary handlebar 200, the bias member is an Allen head screw 244 which engages threads 246 of the adapter 238, wherein rotation of the Allen head screw 244 moves the adapter 238 in a proximal or distal direction. More specifically, clockwise rotation of the Allen head screw 244 causes the adapter 238 to move distally such that rod tension is increased, while counterclockwise rotation of the Allen head screw 244 causes the adapter 238 to move proximally such that rod tension is decreased. It is contemplated that the Allen head screw 244 may have an adjustment range of ten (10) clicks. However, the range may be increased or decreased if necessary.

Preferably, the rod 224 is substantially straight when unloaded (i.e. when the rod 224 is not disposed within the tubing 202). As shown in FIG. 5, the rod 224 is forced to partially conform with the shape of the tubing 202. The rod 224 abuts the interior wall of the tubing 202 at the first bent portion 214, the second bent portion 216, the central region 204, the third bent portion 218, and the fourth bent portion 220. As the Allen head screw 244 is rotated clockwise, the rod 224 is further tensioned such that the contact forces at the first 24, second 216, third 218, and fourth bent portion 220 are increased.

When a rider imposes a downward force on the handgrip regions 210, 212, the handlebar 200 deflects downwardly. During the downward deflection of the handlebar 200, the rod 224 is forced to further bend at the first 214 and fourth bent portion 220 because the contact forces at these regions are further increased, while bending of the rod 224 is reduced at the second 216 and third bent portion 218 because the contact forces at these regions are decreased. Thus, the rod 224 provides the handlebar 200 with additional resistance to bending in the downward direction due to the rod 224 providing a bending resistance at the first 214 and fourth bent portion 220. In a similar fashion, a rider imposing an upward force on the handgrip regions 210, 212 causes the handlebar 200 to deflect upwardly. During the upward deflection of the handlebar 200, the rod 224 is forced to further bend at the second 216 and third bent portion 218 because the contact forces at these regions are further increased, while bending of the rod 224 is reduced at the first 214 and fourth bent portion 220 because the contact forces at these regions are decreased. Thus, the rod 224 provides the handlebar 200 with additional resistance to bending in the upward direction due to the rod 224 providing a bending resistance at the second 216 and third bent portion 218.

In order to further stiffen the handlebar 200, the Allen head screw 244 may be rotated in the clockwise direction to further tension the rod 224. As rod tension is increased, the rod 224 exhibits an increased resistance to bending, and the handlebar 200 is further stiffened. The stiffness of the handlebar 200 may be reduced by simply, rotating the Allen head screw 244 in the counterclockwise direction.

Figure 6:
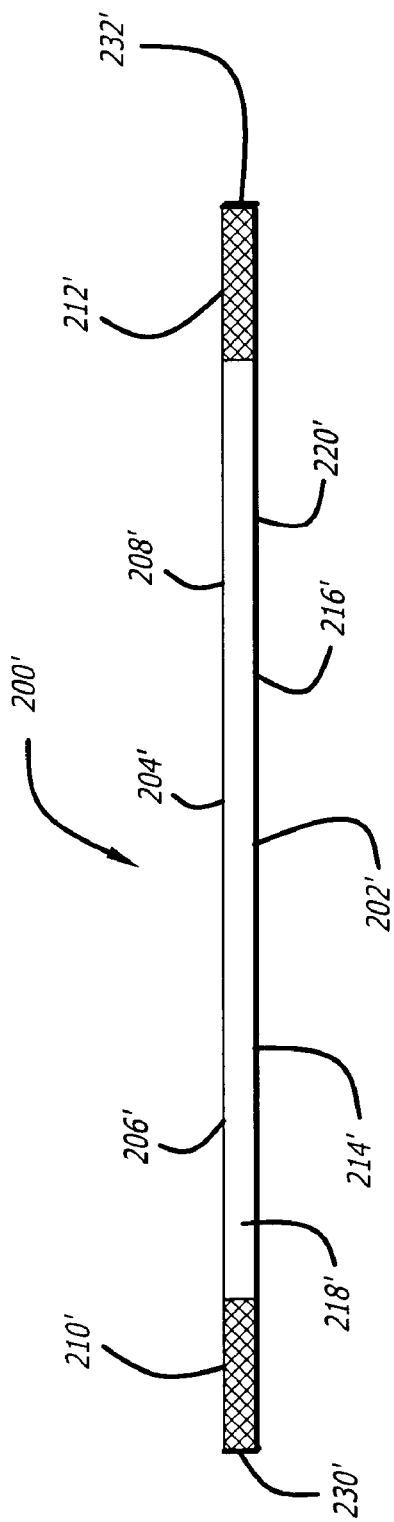
FIG. 6 is a top plan view of another exemplary handlebar of the present invention.
Figure 7:
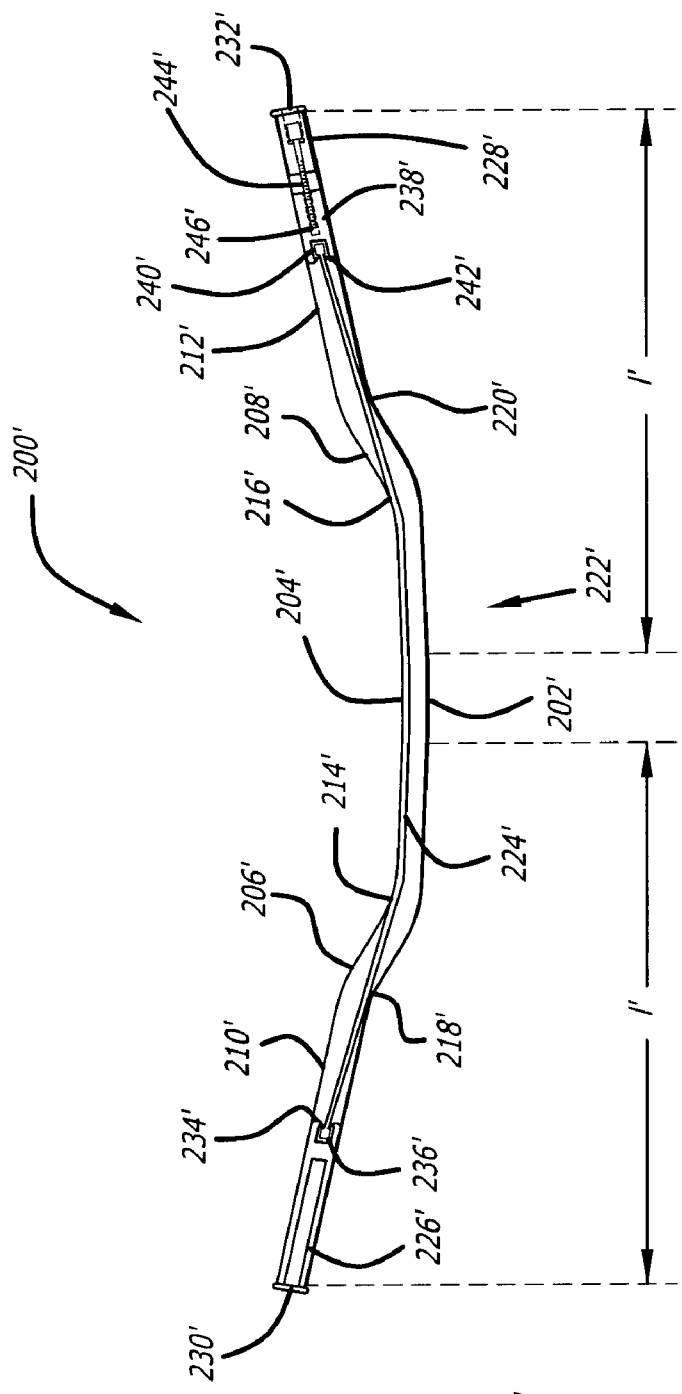
FIG. 7 is a front plan view of the handlebar of FIG. 6 illustrating an adjustable dampening mechanism.

Referring to FIGS. 6, and 7, another exemplary handlebar 200' of the present invention is shown. The handlebar 200' is similar to the embodiment shown in FIGS. 4 and 5 with the exception that the tubing 202' is not bent in the horizontal direction. As such, the tubing 202' appears straight when viewed from the top as shown in FIG. 6. Like components are numbered with the same number and with a prime.

Figure 8:
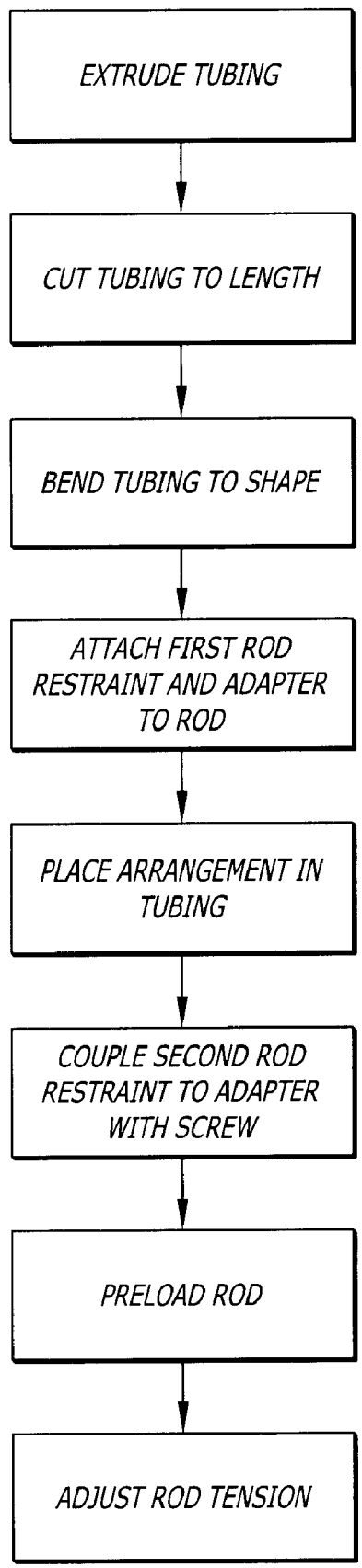
FIG. 8 is a flow diagram for the process of making the handlebars shown in FIGS. 4 through 7.

FIG. 8 is a flow diagram illustrating the process of fabricating the handlebars 200, 200' shown in FIGS. 4 through 7. For the sake of brevity, the following description refers to the handlebar 200 shown in FIGS. 4 and 5. However, it is noted that the following description is similarly applicable to the handlebar 200' shown in FIGS. 6 and 7. The handlebar 200 may be formed by cold extruding the titanium alloy tubing 202. The extruded tubing 202 is then cut to the desired length. The tubing 202 is then bent from the cold extruded "as drawn" state to form the bent portions 214, 216, 218, 220 and to define the central region 204, the pair of bent regions 206, 208, and the pair of handgrip regions 210, 212.

Generally, tubing formed from high strength titanium alloys require annealing prior to forming the small radii bends for handlebars. It has been discovered that the annealing procedure is not required by using a high speed, Computer Numerical Control (CNC) bending apparatus which maintains the "as drawn" tubing 202 in the plastic state during bending. In particular, the "as drawn" tubing 202 is bent at a relatively high and continuous rate to form the bent portions 214, 216, 218, 220 without buckling and to minimize spring back of the tubing 202. The CNC bending apparatus has a programmed bend rate velocity ranging from 10% to 100%, wherein 100% bend rate velocity correlates to a bending rate of 30 revolutions per minute. The correlation is linear such that a 10% bend rate velocity correlates to a bending rate of 3 revolutions per minute. It is noted that other types of bending apparatuses capable of bending non annealed titanium tubes at a relatively high and continuous rate may be used. After the tubing 202 is formed to shape, the handlebar 200 may be cosmetically finished with a coating such as paint, plated, textured by bead blasting, shot peened, polished, or left untreated with the extruded surface finish.

By forming the handlebar 200 from a single length of "as drawn" titanium tubing 202, the handlebar 200 is lightweight, strong, flexible, and durable. Due to the significant strength of the "as drawn" titanium tubing 202, a crossbar is not required and the standardized ⅞ inch outer diameter may be used. The ⅞ inch outer diameter tubing 202 is compatible with most existing triple clamp assemblies and is the preferred diameter for overlapping handgrips (not shown) having a thickness of about ¼ inch, which is best suited for the hands of a typical rider. The elimination of the crossbar not only reduces the weight of the handlebar 200, but also enables the handlebar 200 to absorb more impact energy and thus transmit less shock to the rider's hand, reduce rider fatigue, and provide improved control of the vehicle. In particular, the unsupported span is increased from a length l of a typical handlebar 10 with a crossbar to a length l' of the handlebar 200 of the present invention, wherein the increase in unsupported length allows the tube 202 to react more readily to impact loads by flexing. In addition, with prior art handlebars with crossbars, shock and vibration from one side of a handlebar is transmitted to the other side of the handlebar via the crossbar. The elimination of the crossbar permits each side of the handlebar to function independently.

It is noted that one of the unique features resulting from eliminating the annealing process prior to bending is that a post heat treatment process is not required to strengthen the handlebar 200. As a result, the tensile strength of the bent portions 214, 216, 218, 220 is great than the central region 204, the bent regions 206, 208, and the handgrip regions 210, 212, and the likelihood of breakage at these cites due to fatigue and/or large impact loads is reduced. In other words, the work hardening resulting from the bending process is not negatively affected by a post heat treatment process. Furthermore, processing costs are reduced by eliminating the annealing process for softening the tubing and the heat treatment process for strengthening.

The adjustable dampening mechanism 222 may be installed by attaching the first rod restraint 226 to one end of the rod 224 and attaching the adapter 238 to the other end of the rod 224. The arrangement is forced into the tubing 202 until the ring 230 of the first rod restraint 226 abuts the distal end of the tubing 202. The second rod restraint 228, is inserted into the other end of the tubing 202, and the Allen head screw 244 is rotated in the clockwise direction to engage with the threads 246 of the adapter 238. The Allen head screw 244 is rotated in the clockwise direction until the rod 244 is tensioned to a predetermined preload. An operator may later fine tune the handlebar 200 by rotating the Allen head screw 244 in the appropriate direction.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. For example, there are a number of alternate configurations in which the rod may be adjustably tensioned. The adjustable dampening mechanism may include a pair of rod restraints and a corresponding pair of adapters with Allen head screws so that the dampening of the handlebar may be adjusted by rotating both Allen head screws. Furthermore, the Allen head screw may be replaced by a bolt, ratchet mechanism, or other mechanism which distally/proximally moves the adapter. In another possible configuration, the rod restraints may not be required by providing the adapter with a threaded outer surface which engages with a threaded inner wall of the tubing. With such a configuration, the rod may be further tensioned by rotating the adapter relative to the tubing.

It is claimed:

1. A handlebar for a vehicle, comprising:
   a tubing comprising:
      a central region having a first end and a second end;
      a first bent region extending from the first end of the central region, the first bent region adjoined to the central region by a first bent portion;
      a second bent region extending from the second end of the central region, the second bent region adjoined to the central region by a second bent portion;
      a first handgrip region extending from a distal end of the first bent region, the first handgrip region adjoined to the first bent region by a third bent portion; and
      a second handgrip region extending from a distal end of the second bent region, the second handgrip region adjoined to the second bent region by a fourth bent portion; and
   a rod disposed within the tubing, the rod contacting an inner wall of the tubing at the first, second, third, and fourth bent portion.

2. The handlebar of claim 1, wherein stiffness of the handlebar is adjustable by varying rod tension.

3. The handlebar of claim 1, further comprising:
   a first rod restraint secured at the first handgrip region, the first rod restraint coupled to one end of the rod;
   a second rod restraint secured at the second handgrip region; and
   an adapter coupling the rod to the second rod restraint.

4. The handlebar of claim 3, further comprising:
   a bias member coupling the adapter to the second rod restraint;
   wherein the bias member drives the adapter; and
   wherein the position of the adapter determines rod tension.

5. The handlebar of claim 4, wherein the bias member is a screw, and wherein rod tension is adjusted by rotating the screw.

6. The handlebar of claim 5, wherein an increase in rod tension increases contact forces between the rod and the tubing at the first, second, third, and fourth bent portion, and wherein a decrease in rod tension decreases contact forces between the rod and the tubing at the first, second, third, and fourth bent portion.

7. The handlebar of claim 1, wherein the tensile strength of the rod is greater than the tensile strength of the tubing.

8. The handlebar of claim 1, wherein the rod increases the stiffness of the handlebar.

9. The handlebar of claim 1, further comprising an adjustable dampening mechanism to controllably tension the rod.

10. The handlebar of claim 1, wherein the tubing is an integral titanium tube.

11. The handlebar of claim 1, wherein the central region, the first bent region, and the first handgrip region form a first span, the first span supported at only the central region, and wherein the central region, the second bent region, and the second handgrip region form a second span, the second span supported at only the central region.

12. The handlebar of claim 1, wherein the outer diameter of the tube is ⅞ inch.

13. A handlebar for a vehicle, comprising:
   a tubing comprising:
      a central region having a first end and a second end;
      a first handgrip region extending from the first end of the central region, the first handgrip region adjoined to the first end of the central region by a first bent portion; and
      a second handgrip region extending from the second end of the central region, the second handgrip region adjoined to the second end of the central region by a second bent portion; and
   a rod disposed within the tubing, the rod contacting an inner wall of the tubing at the first and second bent portions.

14. The handlebar of claim 13, wherein stiffness of the handlebar is adjustable by varying rod tension.

15. The handlebar of claim 13, further comprising:
   a first rod restraint secured at the first handgrip region, the first rod restraint coupled to one end of the rod;
   a second rod restraint secured at the second handgrip region; and
   an adapter coupling the rod to the second rod restraint.

16. The handlebar of claim 15, further comprising:
   a bias member coupling the adapter to the second rod restraint;
   wherein the bias member drives the adapter; and
   wherein the position of the adapter determines rod tension.

17. The handlebar of claim 16, wherein the bias member is a screw, and wherein rod tension is adjusted by rotating the screw.

18. The handlebar of claim 17, wherein contact forces between the rod and the tubing at the first and second bent portions increases as rod tension is increased.

19. The handlebar of claim 13, wherein the tensile strength of the rod is greater than the tensile strength of the tubing.

20. The handlebar of claim 13, wherein the rod increases the stiffness of the handlebar.

21. The handlebar of claim 13, further comprising an adjustable dampening mechanism to controllably tension the rod.

* * * * *